United States Patent
Brown et al.

[11] Patent Number: 5,879,613
[45] Date of Patent: *Mar. 9, 1999

[54] BALANCED MULTI-CAVITY INJECTION MOLDING OF LIKE PLASTIC PRODUCTS

[75] Inventors: Paul Phillip Brown, Carlsbad, Calif.; Jens Ole Sorensen, Cayman Island, Cayman Islands

[73] Assignee: Universal Ventures, Cayman Islands

[*] Notice: The term of this patent shall not extend beyond the expiration date of Pat. No. 5,792,409.

[21] Appl. No.: 932,441

[22] Filed: Sep. 17, 1997

Related U.S. Application Data

[63] Continuation of Ser. No. 585,272, Jan. 10, 1996, Pat. No. 5,858,286.

[51] Int. Cl.[6] ................................................ B29C 45/37
[52] U.S. Cl. ................................. 264/297.2; 264/328.8; 264/328.12; 425/572; 425/575; 425/588
[58] Field of Search .......................... 264/297.2, 328.7, 264/328.8, 328.12; 425/572, 575, 577, 588

[56] References Cited

U.S. PATENT DOCUMENTS

| | | |
|---|---|---|
| 5,518,389 | 5/1996 | Nonomura et al. |
| 5,792,409 | 8/1998 | Sorensen et al. ................. 264/297.2 |

FOREIGN PATENT DOCUMENTS

| | | |
|---|---|---|
| 0244783 | 11/1987 | European Pat. Off. |
| 61-229520A | 10/1986 | Japan. |
| 03 146323A | 6/1991 | Japan. |

OTHER PUBLICATIONS

Pye, R.G.W. "Injection Mould Design" 1968, ILIFFE Books ltd. London XP–00207646 p. 148.

*Primary Examiner*—Jill L. Heitbrink
*Attorney, Agent, or Firm*—Edward W. Callan

[57] ABSTRACT

Balanced injection molding in a multi-cavity mold of a plurality of ridged-wall products having is accomplished by providing mold parts defining therebetween at least two cavities for forming the ridged-wall plastic products, wherein each of at least two cavities defines a plurality of flow channels in which injected plastic material flows within the cavity and in which flow channels the first side strips are formed; wherein the relative disposition of the mold parts is adjustable for adjusting the dimensions of the flow channels in at least two mold cavities separately so that when plastic material is injected approximately simultaneously into the at least two mold cavities the injected plastic material flows within the at least two cavities at respective flow rates that cause the at least two mold cavities to be completely filled approximately simultaneously with the injected plastic material.

3 Claims, 2 Drawing Sheets

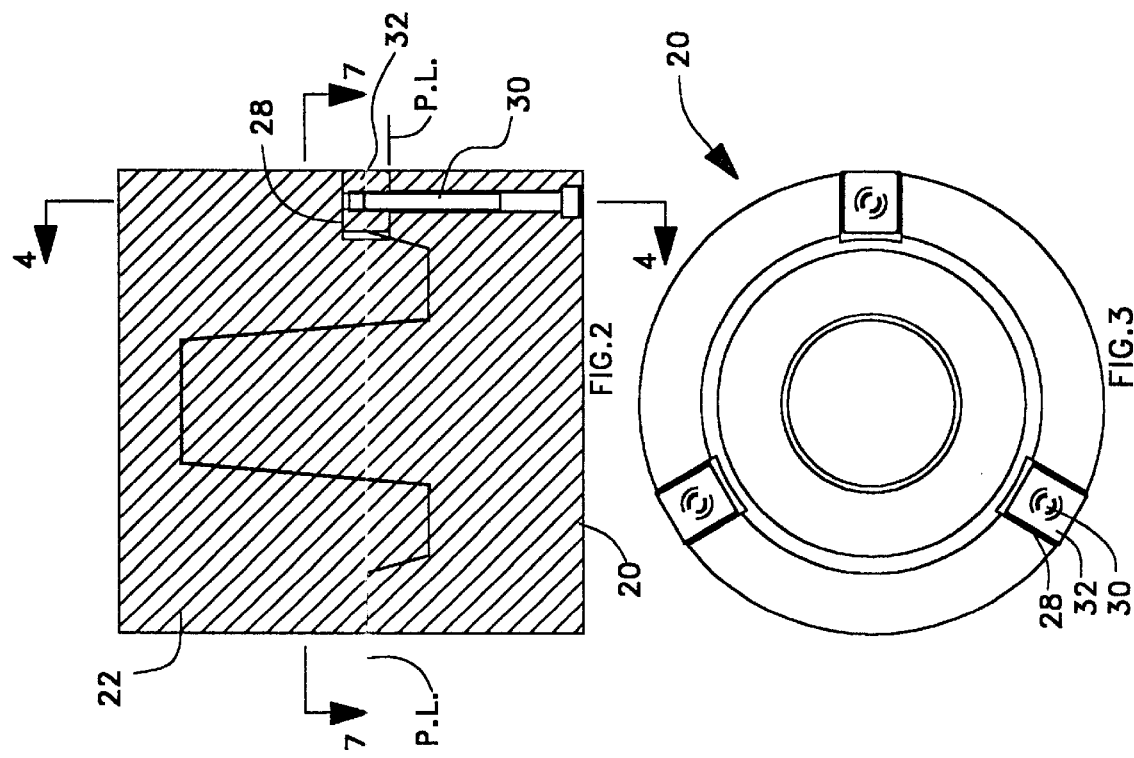
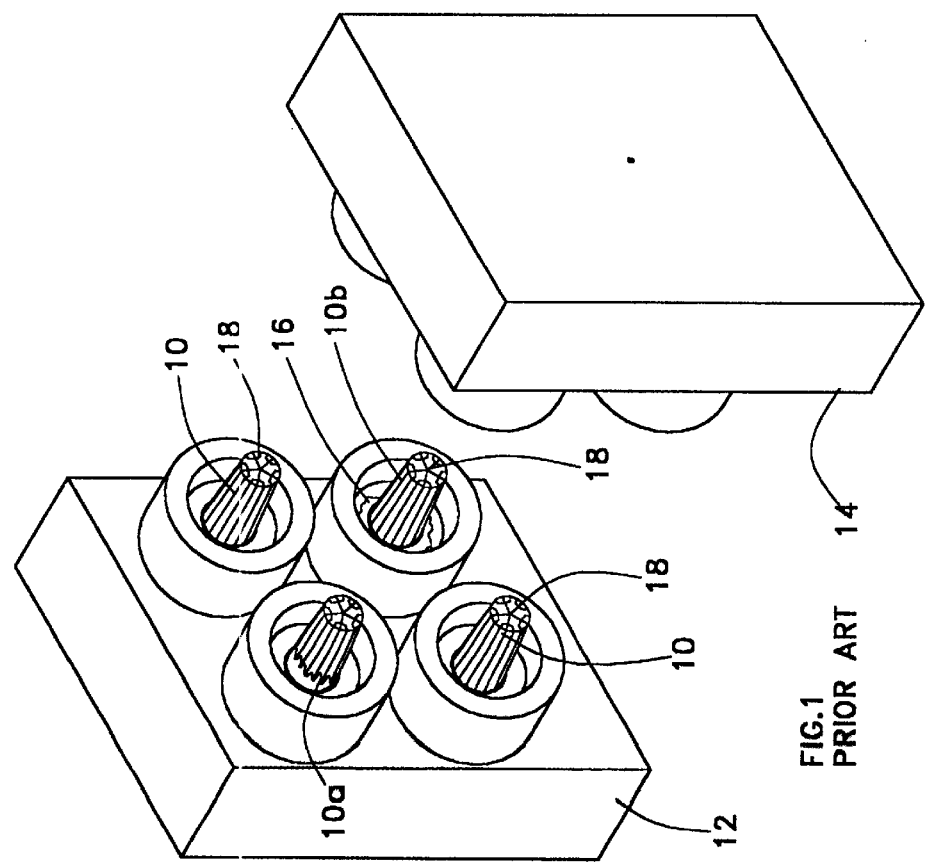

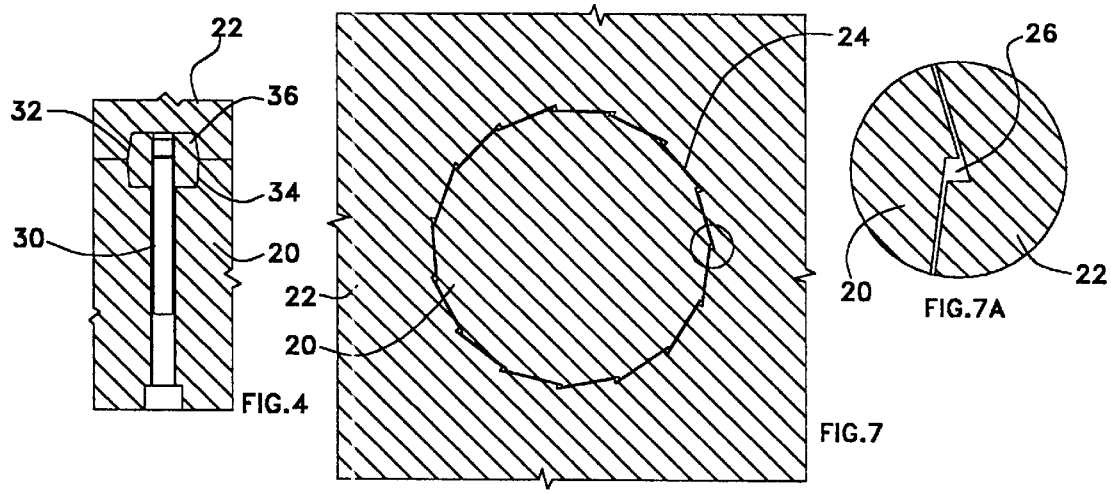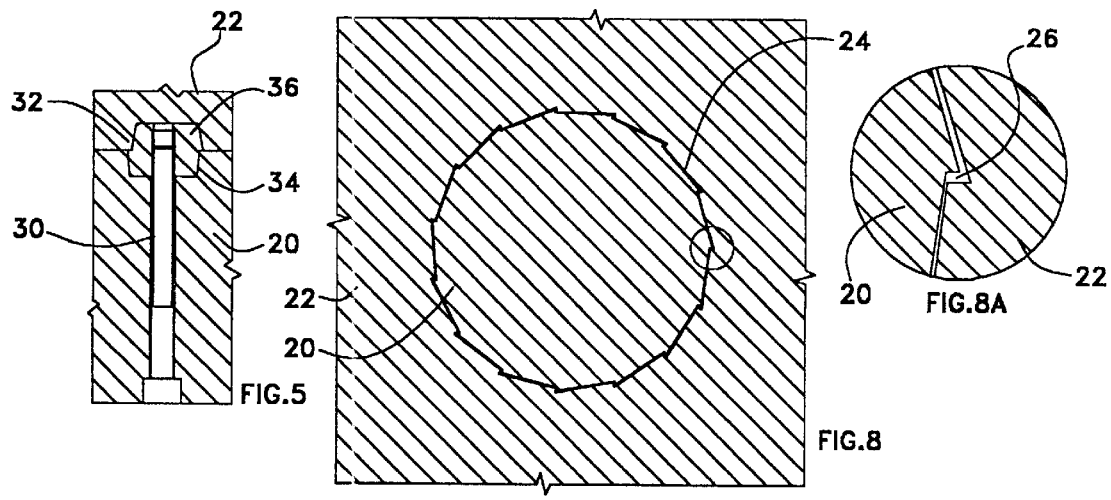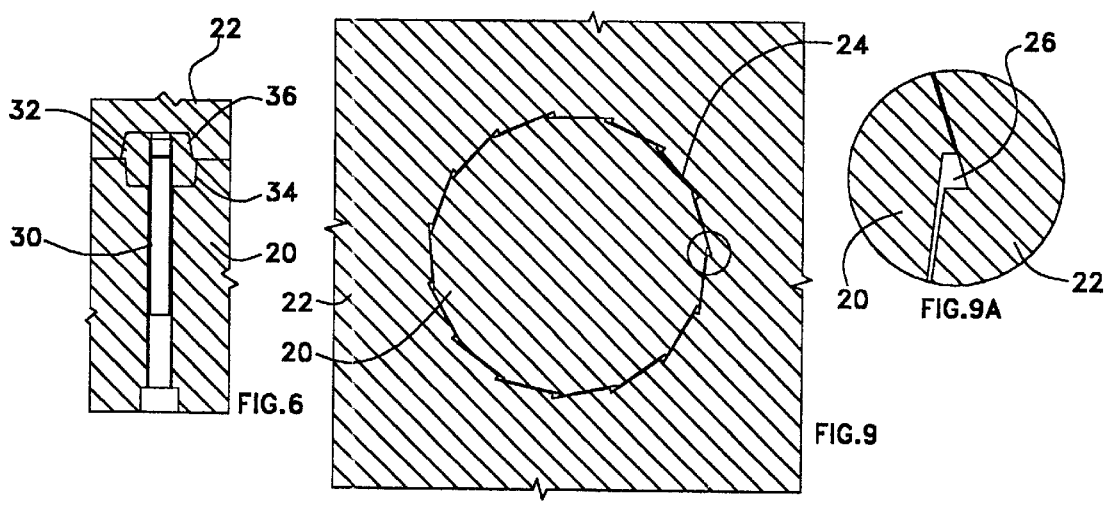

BALANCED MULTI-CAVITY INJECTION MOLDING OF LIKE PLASTIC PRODUCTS

This is a continuation of application Ser. No. 08/585,272 filed Jan. 10, 1996, now U.S. Pat. No. 5,858,286.

BACKGROUND OF THE INVENTION

The present invention generally pertains to injection molding of plastic products and is particularly directed to balanced multi-cavity injection molding of plurality of like products.

One type of product for which it is a difficult to provide balanced filling of the mold cavities when injection molding a plurality of like products with a multi-cavity mold is a ridged-wall product including a plurality of longitudinal folds of alternating ridges and furrows, with each fold including a first side strip laterally extending from the top of a said ridge to the bottom of a said furrow, and a second side strip laterally extending from the bottom of the said furrow to the top of a said ridge next to the said ridge; wherein the first side strip has a different lateral orientation than the second side strip; and wherein the first side strip has a greater wall thickness than the second side strip. Such a product is described in U.S. Pat. No. 5,267,685 to Jens Ole Sorensen.

For efficient manufacture, it is preferred to injection mold such products simultaneously with a multi-cavity mold. A problem incident to multi-cavity injection molding of such products is that all of the cavities of the mold in which the products are formed are not always completely filled simultaneously with the injected plastic material. Referring to FIG. 1, which illustrates a plurality of injection molded hollow ridged-wall plastic products 10, 10a, 10b remaining in one mold part 12 after the mold parts 12, 14 defining the respective cavities in which the products are formed have been separated, it is seen that failure to completely fill all of the mold cavities simultaneously results in some of the cavities being incompletely filled, such that a product 10a therein is not completely formed, and other cavities being overfilled, such that a flashing of excess plastic 16 is attached to a product 10b formed therein. The gates through which the plastic material is injected into the mold cavities are located at the center of the end of the respective cavities at which closed ends 18 of the hollow plastic products 10, 10a, 10b are formed.

SUMMARY OF THE INVENTION

The present invention provides a method of balanced injection molding of a plurality of like plastic products in a multi-cavity mold, wherein each of at least two mold cavities defines a said like product, the method comprising the steps of:

(a) providing mold parts defining therebetween said at least two cavities for forming said like plastic products; and (b) injecting plastic material approximately simultaneously into said at least two mold cavities to form the products;

wherein step (a) comprises the step of:

(c) prior to step (b), adjusting the relative dimensions of said at least two mold cavities to be non-uniform such that when plastic material is injected in accordance with step (b) injected plastic material flows within said at least two mold cavities at respective flow rates that cause said at least two mold cavities to be completely filled approximately simultaneously with the injected plastic material.

Additional features of the present invention are described with reference to the detailed description of the preferred embodiments.

BRIEF DESCRIPTION OF THE DRAWING

FIG. 1 is a perspective view of a mold utilized in a prior art multi-cavity injection molding method wherein a plurality of ridged-wall plastic products remain in one mold part after the mold parts defining the product-forming cavities have been separated.

FIG. 2 is a side sectional view of a preferred embodiment of a mold for forming ridged-wall products in accordance with the present invention.

FIG. 3 top view of a first mold part of the mold of FIG. 2, with adjustment blocks disposed in portions of the first mold part.

FIG. 4 is a sectional view of a portion of the mold of FIG. 2 taken along line 4—4 when the first and second mold have a given disposition in relation to one another.

FIG. 5 is a sectional view corresponding to FIG. 4 wherein the second mold part has a different disposition in relation to the first mold part than that shown in FIG. 4.

FIG. 6 is another sectional view corresponding to FIG. 4 wherein the second mold part has a different disposition in relation to the first mold part than that shown in FIGS. 4 and 5.

FIG. 7 is a sectional view of the mold of FIG. 2 taken along line 7—7 when the first and second mold parts have a relative disposition as shown in FIG. 4.

FIG. 7A is an enlarged view of a portion of the mold cavity defined between first and second mold parts having the relative disposition shown in FIG. 7. Said portion is encircled in FIG. 7.

FIG. 8 is a sectional view of the mold of FIG. 2 taken along line 7—7 when the first and second mold parts have a relative disposition as shown in FIG. 5.

FIG. 8A is an enlarged view of a portion of the mold cavity defined between first and second mold parts having the relative disposition shown in FIG. 8. Said portion is encircled in FIG. 8.

FIG. 9 is a sectional view of the mold of FIG. 2 taken along line 7—7 when the first and second mold parts have a relative disposition as shown in FIG. 6.

FIG. 9A is an enlarged view of a portion of the mold cavity defined between first and second mold parts having the relative disposition shown in FIG. 9. Said portion is encircled in FIG. 9.

DETAILED DESCRIPTION

Referring to FIGS. 2 through 9A, a preferred embodiment of the mold of the present invention includes a first mold part 20 and a second mold part including at least two segments 22 which when combined with the first mold part 20 define therebetween at least two cavities 24 for respectively forming ridged-wall plastic products, such as described in the above-referenced U.S. Pat. No. 5,267,685. Each product includes a plurality of longitudinal folds of alternating ridges and furrows. Each fold includes a first side strip laterally extending from the top of one ridge to the bottom of one furrow; and a second side strip laterally extending from the bottom of the one furrow to the top of another ridge next to the one ridge. The first side strip has a different lateral orientation than the second side strip and the first side strip has a greater wall thickness than the second side strip. Each mold cavity 24 defines a plurality of flow channels 26 in which injected plastic material flows within the cavity 24. The first side strips are formed in the flow channels 26.

The respective disposition of the at least two separate segments 22 of the second mold part in relation to the first mold part 20 are separately adjustable for adjusting the dimensions of the flow channels 26 in the at least two mold cavities 24 separately so that when plastic material is injected approximately simultaneously into the at least two mold cavities 24 the injected plastic material flows within the at least two cavities 24 at respective flow rates that cause the at least two mold cavities 24 to be completely filled approximately simultaneously with the injected plastic material.

When the product is a hollow product, the separate segments 22 of the second mold part are separately rotatable in relation to the first mold part 20 for adjusting the dimensions of the flow channels 26 of the respective cavities 24.

When the first mold part 20 is joined at a parting line P.L. to the separate segments 22 of the second mold part to define the respective cavities 24 therebetween, a plurality of adjustment spaces 28 are also defined about the parting line P.L. between portions of the first mold part 20 and portions of the respective segments 22 of the second mold part.

Bolts 30 that are anchored to the first mold part 20 extend into each of the adjustment spaces. Adjustment blocks 32 are screwed onto the bolts 30 for disposition in the adjustment spaces 28 in order to lock the respective segments 22 of the second mold part in a fixed position in relation to the first mold part 20 when the first mold part 20 and the respective segments 22 of the second mold part are joined at the parting line P.L. The blocks 32 each have a first section 34 for disposition in at least a region of the adjustment space 28 on the same side of the parting line P.L. as the first mold part 20 and a second section 36 for disposition in at least a region of the adjustment space 28 on the same side of the parting line as the segment 22 of the second mold part. There are a plurality of sets of blocks 32 for enabling different degrees of adjustment between the first mold part 20 and the respective segments 22 of the second mold part; and the disposition of the first section 34 in relation to the second section 36 is different for the different sets of blocks 32. With reference to the disposition of a segment 22 of the second mold part in relation to the first mold part 20, as shown in FIG. 7, that is provided when the relative disposition between the first section 34 and the second section 36 of the block 32 is as shown in FIG. 7A, a set of blocks 32 having the relative disposition between the first section 34 and the second section 36 of the block 32 shown in FIG. 8A is used for rotating a segment 22 of a second mold part counterclockwise in relation to the first mold part 20 to provide the disposition of the segment 22 of the second mold part in relation to the first mold part 20 that is shown in FIG. 8; and a set of blocks 32 having the relative disposition between the first section 34 and the second section 36 of the block 32 shown in FIG. 9A is used for rotating a segment 22 of a second mold part clockwise in relation to the first mold part 20 to provide the disposition of the segment 22 of the second mold part in relation to the first mold part 20 that is shown in FIG. 9.

In balancing the mold, the dimensions of the flow channels 26 initially are larger than required for forming first side strips of a preferred dimension, as shown in FIG. 9A; and plastic material is injected at a given injection pressure approximately simultaneously into the at least two mold cavities 24 in order to form the products with the injected plastic material. The relative extent to which the different cavities 24 are filled with the injected plastic material is measured. When the at least two mold cavities 24 are not filled to the same degree approximately simultaneously, the relative dimensions of the flow channels 26 are adjusted so that when plastic material is injected into the mold cavities 24, the injected plastic material flows within the at least two cavities at respective flow rates that cause the at least two mold cavities 24 to be filled to the same degree approximately simultaneously with the injected plastic material.

The relative dispositions between a segments 22 of the second mold part and the second mold part 20 are adjusted by inserting respective sets of blocks 32 into the adjustment spaces 28.

Preferably, the dimensions of the flow channels 26 of the respective cavities 24 are adjusted such that the flow channels 26 for at least one of the mold cavities 24 are of a dimension required for forming first side strips of the preferred dimension, as shown in FIG. 7A. Sometimes, the flow channels 26 for at least another of the mold cavities 24 are either of a dimension larger than required for forming first side strips of the preferred dimension, as shown in FIG. 9A, or of a dimension smaller than required for forming first side strips of the preferred dimension, as shown in FIG. 8A. The relative differences between the dimensions of the flow channels shown in FIGS. 7A, 8A and 9A are greatly exaggerated in the Drawing.

However, if such an adjustment does not result in the injected plastic material flowing within the at least two cavities 24 at respective flow rates that cause the at least two mold cavities 24 to be filled to the same degree approximately simultaneously with the injected plastic material, the dimensions of the flow channels 26 of the respective cavities 24 are adjusted such that the flow channels 26 for at least one of the mold cavities 24 are of a dimension larger than required for forming first side strips of the preferred dimension, as shown in FIG. 9A, and the flow channels 26 for at least another of the mold cavities 24 are of a dimension smaller than required for forming first side strips of the preferred dimension, as shown in FIG. 8A.

When such adjustments result in the injected plastic material flowing within the at least two cavities 24 at respective flow rates that cause the at least two mold cavities 24 to be filled to the same degree approximately simultaneously with the injected plastic material, the multi-cavity mold is provided for balancing injection molding of a plurality of ridged-wall products and plastic material is injected approximately simultaneously into the at least two mold cavities 24 to form such products.

In alternative embodiments (not shown), either or both of the first mold part and the second mold part includes segments of which the disposition may be adjusted in relation to the other mold part in order to cause the injected plastic material to flow within the at least two cavities at respective flow rates that cause the at least two mold cavities to be filled to the same degree approximately simultaneously with the injected plastic material.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A method of balanced injection molding of a plurality of like plastic products in a multi-cavity mold, wherein each of at least two mold cavities defines a said like product, the method comprising the steps of:

(a) providing mold parts defining therebetween said at least two cavities for forming said like plastic products; and (b) injecting plastic material approximately simultaneously into said at least two mold cavities to form the products;

wherein step (a) comprises the step of:

(c) prior to step (b), adjusting the relative dimensions of said at least two mold cavities to be non-uniform such that when plastic material is injected in accordance with step (b) injected plastic material flows within said at least two mold cavities at respective flow rates that cause said at least two mold cavities to be completely filled approximately simultaneously with the injected plastic material.

2. A method according to claim 1; wherein each of said at least two cavities defines a plurality of flow channels in which injected plastic material flows within the cavity, and wherein the relative dimensions of the flow channels in said at least two mold cavities defined by the mold parts provided in accordance with step (a) are non-uniform.

3. A method of balanced injection molding of a plurality of like plastic products in a multi-cavity mold, wherein each of at least two mold cavities defines a said like product, the method comprising the steps of:

(a) providing mold parts defining therebetween said at least two cavities for forming said like plastic products; and (b) injecting plastic material approximately simultaneously into said at least two mold cavities to form the products;

wherein step (a) comprises the step of:

(c) adjusting the relative dimensions of said at least two mold cavities to be non-uniform such that when plastic material is injected in accordance with step (b) injected plastic material flows within said at least two mold cavities at respective flow rates that cause said at least two mold cavities to be completely filled approximately simultaneously with the injected plastic material;

wherein said like products are ridged-wall products, each comprising a plurality of longitudinal folds of alternating ridges and furrows, each fold including a first side strip laterally extending from the top of a said ridge to the bottom of a said furrow; and a second side strip laterally extending from the bottom of the said furrow to the top of a said ridge next to the said ridge; wherein the first side strip has a different lateral orientation than the second side strip; and wherein the first side strip has a greater wall thickness than the second side strip;

wherein each of said at least two cavities defines a plurality of flow channels in which injected plastic material flows within the cavity and in which flow channels the first side strips are formed; and wherein the relative dimensions of the flow channels in said at least two mold cavities defined by the mold parts provided in accordance with step (a) are non-uniform.

* * * * *

UNITED STATES PATENT AND TRADEMARK OFFICE
CERTIFICATE OF CORRECTION

Page 1 of 2

PATENT NO. : 5,879,613
DATED : MARCH 9, 1999
INVENTOR(S) : PAUL PHILIP BROWN ET AL.

It is certified that error appears in the above-identified patent and that said Letters Patent is hereby corrected as shown below:

Figure 2 should be deleted to appear as per attached drawing.

Signed and Sealed this

Tenth Day of August, 1999

*Attest:*

Q. TODD DICKINSON

*Attesting Officer*  Acting Commissioner of Patents and Trademarks

UNITED STATES PATENT AND TRADEMARK OFFICE
CERTIFICATE OF CORRECTION

PATENT NO : 5,879,613

DATED : MARCH 9, 1999

INVENTOR(S): PAUL PHILIP BROWN ET AL.

It is certified that error appears in the above-identified patent and that said Letters Patent is hereby corrected as shown below:

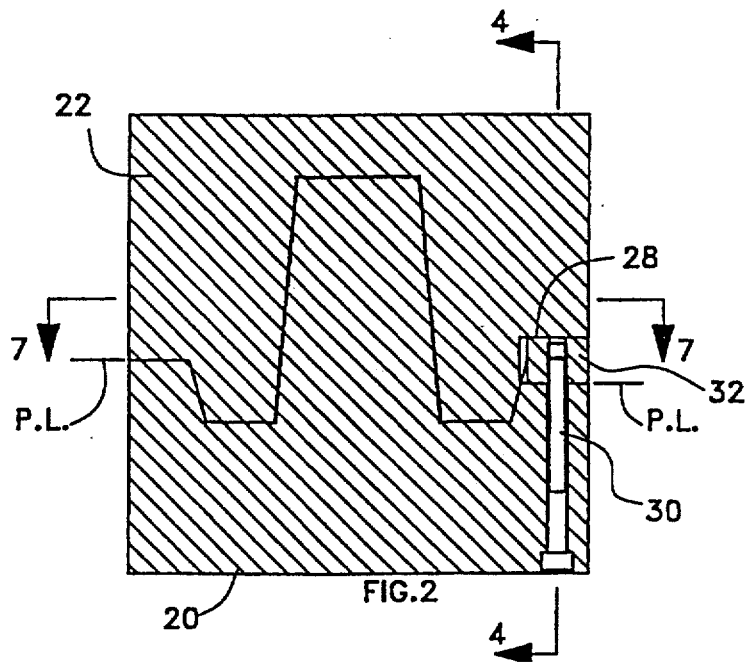

FIG.2